United States Patent
Kim et al.

(10) Patent No.: US 9,915,014 B2
(45) Date of Patent: Mar. 13, 2018

(54) FLEXIBLE SECOND GAS BARRIER WITH IMPROVED FATIGUE STRENGTH AND METHOD FOR MANUFACTURING THE SAME

(71) Applicant: Hankuk Carbon Co., Ltd., Gyeongsangnam-do (KR)

(72) Inventors: Jeong Cheol Kim, Gyeongsangnam-do (KR); Min Gyu Kim, Gyeongsangnam-do (KR); Kyung Han Kim, Gyeongsangnam-do (KR); Ju Hwan Hong, Gyeongsangnam-do (KR)

(73) Assignee: Hankuk Carbon Co., Ltd., Miryang-si, Gyeongsang (KR)

( * ) Notice: Subject to any disclaimer, the term of this patent is extended or adjusted under 35 U.S.C. 154(b) by 0 days.

(21) Appl. No.: 15/194,952

(22) Filed: Jun. 28, 2016

(65) Prior Publication Data
US 2017/0335494 A1    Nov. 23, 2017

(30) Foreign Application Priority Data

May 17, 2016 (KR) .................. 10-2016-0060230

(51) Int. Cl.
| | |
|---|---|
| *D03D 15/02* | (2006.01) |
| *D03D 1/00* | (2006.01) |
| *D03D 15/00* | (2006.01) |
| *B32B 5/24* | (2006.01) |
| *B32B 27/12* | (2006.01) |
| *D03D 1/02* | (2006.01) |

(Continued)

(52) U.S. Cl.
CPC ............. *D03D 15/02* (2013.01); *B32B 5/24* (2013.01); *B32B 27/12* (2013.01); *D03D 1/00* (2013.01);

(Continued)

(58) Field of Classification Search
CPC .... D03D 15/00; D03D 15/02; D03D 15/0011; D03D 1/00; D03D 2700/0137;

(Continued)

(56) References Cited

U.S. PATENT DOCUMENTS

| | | | |
|---|---|---|---|
| 6,540,867 B1* | 4/2003 | Cochran | ............... B29C 43/003 |
| | | | 156/177 |
| 2002/0124904 A1* | 9/2002 | Howland | ......... A41D 19/01505 |
| | | | 139/420 R |

(Continued)

FOREIGN PATENT DOCUMENTS

| | | |
|---|---|---|
| JP | 2005-324481 A | 11/2005 |
| KR | 2004-0100240 A | 12/2004 |

(Continued)

*Primary Examiner* — Camie S Thompson
(74) *Attorney, Agent, or Firm* — Harness, Dickey & Pierce, P.L.C.

(57) ABSTRACT

A flexible second gas barrier for a liquefied gas storage tank which includes a stiffener fabric weaved with two or more kinds of fiber yarn selected from a group consisting of a glass fiber, a carbon fiber, an aramid fiber, and a synthetic fiber. The stiffener fabric is weaved so that a hybrid fiber yarn is made by 2-ply yarning two or more kinds of a single yarn or a twisted yarn of fiber yarn selected from a group consisting of a glass fiber, a carbon fiber, an aramid fiber, or a synthetic fiber, is included in the weft and/or warf so that repeated fatigue resistance, even under cryogenic conditions, is achieved, which ultimately has the effect of solving the problems associated with repeated load increase imposed on the second gas barrier as the thickness of LNGC Foam increases.

19 Claims, 2 Drawing Sheets

(52) U.S. Cl.
CPC ........... *D03D 1/02* (2013.01); *D03D 15/0011* (2013.01); *D03D 2700/0137* (2013.01); *D03D 2700/0148* (2013.01); *D10B 2101/06* (2013.01); *D10B 2331/021* (2013.01); *D10B 2505/10* (2013.01)

(58) Field of Classification Search
CPC .............. D03D 2700/0148; B32B 1/02; B32B 2262/101; B32B 2262/106; B32B 5/024
USPC ....... 442/208–220, 206; 220/560.04, 560.07, 220/560.11, 901, 4.14, 4.15, 4.12; 428/300.4; 96/11, 12
See application file for complete search history.

(56) References Cited

U.S. PATENT DOCUMENTS

2009/0173229 A1\* 7/2009 Nagase ..................... B32B 7/02
 96/12
2015/0361596 A1\* 12/2015 Valerie ............. B60K 15/03177
 428/34.5

FOREIGN PATENT DOCUMENTS

| KR | 2009-0104688 | A | 10/2009 |
|----|----|----|----|
| KR | 20130050837 | \* | 5/2013 |
| WO | 2006-130019 | A1 | 12/2006 |

\* cited by examiner

FLEXIBLE SECOND GAS BARRIER WITH IMPROVED FATIGUE STRENGTH AND METHOD FOR MANUFACTURING THE SAME

FIELD

The present invention relates to a flexible second gas barrier for liquefied gas storage tank, which is characterized by a significant improvement of repeated fatigue resistance under cryogenic conditions, by using a stiffener fabric which is made by blend weaving two or more kinds of a glass fiber, a carbon fiber, an aramid fiber, and a synthetic fiber. More specifically, the present invention relates to a flexible second gas barrier for liquefied gas storage tank having greatly improved fatigue resistance through replacement with a stiffener fabric which was weaved by applying a hybrid fiber yarn to one part or the whole of the fabric, which is weaved alone or by twisting a single yarn or a twisted yarn by selecting two or more of the fiber yarn from a glass fiber, carbon fiber, aramid fiber, and a synthetic fiber, or which is made by twisting 2 or more kinds of a single yarn or a twisted yarn of a glass fiber, a carbon fiber, an aramid fiber, or a synthetic fiber.

BACKGROUND

The present invention relates to second gas barrier which prevents the leakage of gas by being used for a liquefied natural gas (LNG) and other gas storage tanks. Gases such as LNG have the risk of explosion when it leaks out of the gas storage tank, and in particular, the LNG liquefaction temperature is less than or equal to 163° C. The conventional LNG storage tank is composed of a first gas barrier, a heat insulating material, and a second gas barrier, in order to prevent the leakage of gas in a more stable manner in the adverse conditions of below 163° C. Since second barrier must have the characteristic of being able to prevent gas leakage secondarily in case of the primary barrier damage, it is one of the important materials used for LNG storage tanks.

The background technology for the present invention is KR 10-2013-0050837 (Patent Document 1). The above mentioned background art provides a flexible second gas barrier for liquefied gas storage tank, wherein the adhesive strength is improved and the mechanical properties is strengthened by using an aluminum foil which has undergone physical and chemical treatments on both sides, for the improvement of flexibility and adhesive strength, and also, wherein the thermal stability is ensured and the tensile strength is improved by using an urethane elastomer as an adhering sheet on the stiffener fabric made of a glass fiber.

Recently, LNG ship cargo is further enlarged, and as the thickness of LNGC Foam becomes thicker in order to improve the BOR performance, which is a loss rate of LNG during voyage, the repeated load according to the displacement which is imposed on the second gas barrier is also on the increases, and in conventional technology, there was a limit to solve the problems associated with repeated load increase imposed on second gas barrier under cryogenic conditions. Therefore, there was a need to improve the fatigue resistance of the second gas barrier.

SUMMARY

Technical Problem

The present invention is devised in order to solve the above-mentioned problems, and aims to provide a flexible second gas barrier for liquefied gas storage tank which is characterized by a significant improvement of fatigue resistance under cryogenic fatigue load conditions, by changing and applying the fiber of the stiffener fabric.

Technical Solution

The present invention, in order to solve the above problems, provides a flexible second gas barrier for liquefied gas storage tank with greatly improved repeated fatigue resistance under cryogenic conditions, which is characterized by including a stiffener fabric which is weaved with two or more fiber yarns selected from the group consisting of a glass fiber, a carbon fiber, an aramid fiber and a synthetic fiber.

A stiffener fabric that make up the second gas barrier of the present invention includes both of the case of each fiber yarn which forms the weft and warf being another type (heterogenous), and each fiber yarn which forms the weft and warf being the same type, and is characterized by being weaved of various mixtures of different weaving densities and mixing ratios.

Also, a stiffener fabric that make up the second gas barrier of the present invention is two or more kinds of fiber yarn selected from the group consisting of a glass fiber, a carbon fiber, an aramid fiber and a synthetic fiber, and the form of each fiber yarn selected from above is characterized by being selected from the group consisting of a single yarn, a twisted yarn, and a 2-ply yarn.

Also, the second gas barrier of the present invention includes a stiffener fabric which is weaved so that at least one of the following are included in more than one place in weft or warf: two kinds of a single yarn of fiber yarn selected from the group consisting of a glass fiber, a carbon fiber, an aramid fiber and a synthetic fiber; or a hybrid fiber yarn which is made by 2-ply yarning a single yarn or a twisted yarn. Here, the following cases are included: all of the weft and warf of said fabric are said hybrid fiber yarn; or the weft of said fabric is said hybrid fiber yarn and the warf of said fabric may be one or more of a single yarn, a twisted yarn or a 2-ply yarn of fiber yarn selected from the group consisting of a glass fiber, a carbon fiber, an aramid fiber and a synthetic fiber; or the weft of said fabric is a single yarn, a twisted yarn or a 2-ply yarn of fiber yarn selected from the group consisting of a glass fiber, a carbon fiber, an aramid fiber and a synthetic fiber, and the warf of said fabric is said hybrid fiber yarn.

Also, a second gas barrier of the present invention is characterized by including a stiffener fabric which is weaved by selecting and treating at least one kind selected from the group consisting of a chemical surface treatment and a physical surface treatment on the surface of the fiber yarn which forms said stiffener fabric.

Advantageous Effects

The present invention provides a flexible second gas barrier for liquefied gas storage tank which is characterized by a significant improvement in repeated fatigue resistance through a stiffener fabric which is made by blend weaving two or more kinds selected from the group consisting of a glass fiber, a carbon fiber, an aramid fiber, and a synthetic fiber, and through that, demonstrates a very useful effect of high improvement of fatigue resistance under cryogenic fatigue load conditions.

DRAWINGS

The drawings attached hereinafter in the present specification are intended to illustrate the examples, and has the role of aiding further understanding of the technical concepts of the the present invention together with the detailed description of the invention. Therefore, the present invention should not be construed as being limited to only those listed in the attached drawings.

DETAILED DESCRIPTION

Below, the present invention is described in detail by reference to the examples that have been presented in the attached drawings. However, the examples presented herein are for exemplary purposes for clear understanding of the present invention, and the present invention is not limited thereto.

Figure 1:
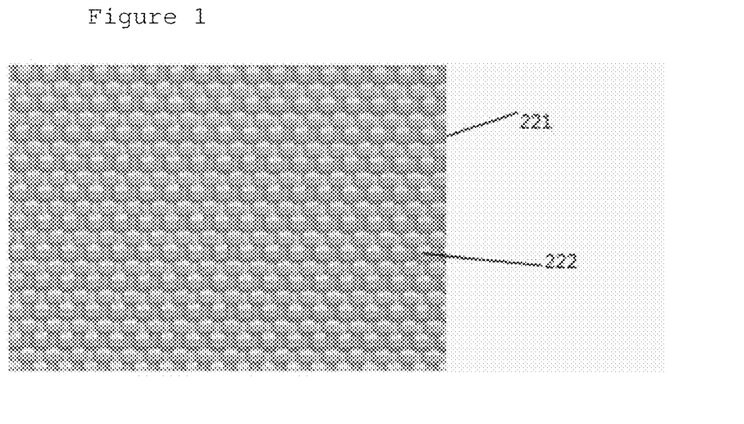
FIG. 1 is a structural diagram of a stiffener fabric weaved by applying a glass fiber and an aramid fiber of the present invention.
Figure 2:
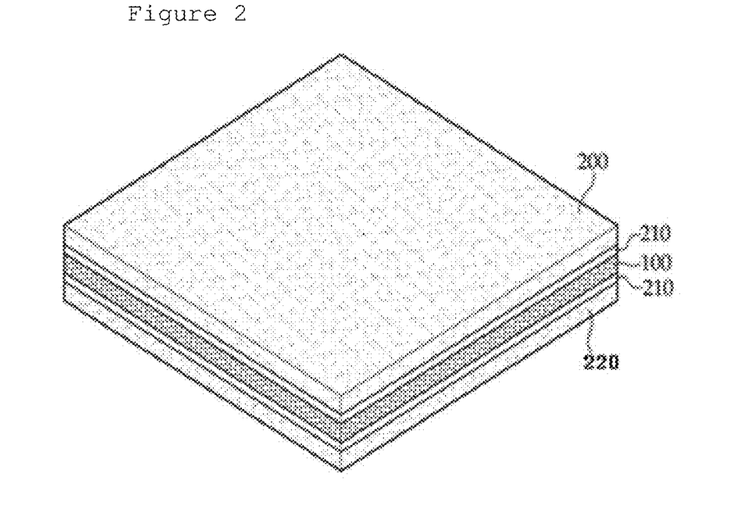
FIG. 2 is a structural diagram of a flexible second gas barrier for liquefied gas storage tank which was manufactured by applying a stiffener fabric of the present invention.

As illustrated in FIG. 2, a flexible second gas barrier for liquefied gas storage tank, which is characterized by a significant improvement of fatigue resistance under cryogenic fatigue load conditions according to an example of the present invention, has an integrally molded layered substrate by attaching an urethane adhering sheet (210) and a stiffener fabric (220) on both sides of an aluminum foil (100) and said aluminum foil (100).

Said aluminum foil (100) product used herein has a thickness of between 50~100 μm, which is the optimal thickness for having the flexibility, and it is desirable to use series 10 of an aluminum foil which is a soft product having a purity of more than 99.2%. When the thickness of the aluminum foil (100) exceeds 100 μm, the physical properties fall lower since the flexibility cannot be properly expressed, and when the thickness is less than 50 μm, there are problems such as peel strength reduction and breakage. The aluminum foil is used for the purpose of enhancing the airtightness of the gas permeation, and the composition of aluminum being greater than or equal to 99.2% indicates the purity of the aluminum foil, and the rest of the composites are silicon, iron, copper, and magnesium, etc.

Said aluminum foil (100) may undergo a surface treatment of polyamide/silane compounds after being treated with any one of a chromate, a plasma, and a corona, on both sides. The purpose of undergoing treatment with any one of a chromate, a plasma, and a corona, on both sides of the aluminum foil (100) is to improve the physical and chemical adhesion between the urethane adhering sheet and the aluminum foil (100).

On both sides of said aluminum foil (100), a stiffener (200) which is composed of an urethane adhering sheet (210) attached to one side of the surface of a stiffener fabric (220) and is thus integrally formed.

Said stiffener (200) is configured so that the side composed of an urethane adhering sheet (210) is attached to the aluminum foil (100). The urethane adhering sheet (210) is made to be able to secure the thermal stability of the second gas barrier product, by using a thermoplastic polyurethane elastomer to set the melting temperature to be 160° C. or more. Said urethane adhering sheet can be set to have not only heat resistance but also improved tensile strength by using that with more than 90 A in the rubber hardness tester, and it is desirable that the thickness is 50~200 μm.

A preferred example of a manufacturing method of a second gas barrier of the present invention comprises the following stages of: preparation of a fiber yarn which is used for weaving a stiffener fabric; physical and chemical treatments to the surface of the selected fiber yarn; weaving of a stiffener fabric with said surface treated fiber yarn; surface treatment to the aluminum foil in order to improve the adhesion between the aluminum foil and the urethane adhering sheet; stiffener molding process for integrally molding by passing said prepared stiffener fabric and the urethane adhering sheet through a heating roller of 150~180° C. and the pressure roller; sheeting process wherein the stiffener to which an urethane adhering sheet is integrally molded is laminated to both sides of the aluminum foil and the laminate undergoes continuous molding with the use of a rotocure molding machine; stabilizing process for heat treatment and post cure of the sheeted laminate to allow stabilization.

Hereinunder, the process for preparing a stiffener fabric will be described in detail.

Firstly, in order to weave a stiffener fabric, a fiber yarn must be selected to be applied to the warf and weft.

A second gas barrier of the present invention is characterized by including a stiffener fabric which is weaved with two or more kinds of fiber yarn selected from the group consisting of a glass fiber, a carbon fiber, an aramid fiber and a synthetic fiber. This includes the case in which each fiber yarn forming the weft and warf of the stiffener are of different types (heterogenous), and the case in which each fiber yarn forming the weft and warf of the stiffener are of the same type (homogenous). In addition, a stiffener fabric of the present invention is characterized by being weaved of various mixtures of different weaving densities and mixing ratios of fiber yarns.

Here, the case in which each fiber yarn forming the weft and warp of stiffener fabric is a different type, may be exemplified by cases in which: ① Firstly, 2 types of fiber yarn, which is an aramid fiber yarn and a glass fiber yarn, are selected and weaved so that the aramid fiber yarn is applied in the weft, and a glass fiber yarn is applied in the warf; ② 3 types of fiber yarn, which is an aramid fiber yarn, a glass fiber yarn, and a synthetic fiber yarn, are selected and weaved so that the aramid fiber yarn and the glass fiber yarn is applied in the weft at various mixing ratios, and a synthetic fiber yarn and a glass fiber yarn is applied in the warf at various mixing ratios; ③ 3 types of fiber yarn, which is a glass fiber yarn, a carbon fiber, and a synthetic fiber yarn, are selected and weaved so that the glass fiber yarn is applied in the weft, and a carbon fiber yarn and a synthetic fiber yarn is applied in the warf at various mixing ratios.

On the other hand, the case in which each fiber yarn forming the weft and warf of the stiffener are of the same type indicates the following exemplary cases: ① 2 types of fiber yarn, which is an aramid fiber yarn and a glass fiber yarn as a type of a fiber yarn, are selected and weaved so that these aramid fiber yarns and glass fiber yarns are applied in the weft and the warf at various mixing ratios; ② 3 types of fiber yarn, which is an aramid fiber yarn, a carbon fiber yarn, and a glass fiber yarn as a type of a fiber yarn, are selected and weaved so that these fiber yarns are applied in the weft and the warf at various mixing ratios.

In the present invention, each kinds of the fiber yarn forming the weft and the warf of a stiffener fabric are more than two kinds of fiber yarn selected from the group consisting of a glass fiber, a carbon fiber, an aramid fiber and a synthetic fiber, and the form of each fiber yarn which is selected from above, includes all the cases of a single yarn or a twisted yarn or 2-ply yarn.

Also, a second gas barrier of the present invention includes a stiffener fabric which is weaved so that at least one of the following are included in more than one place in weft or warf: two kinds of a single yarn of fiber yarn selected from the group consisting of a glass fiber, a carbon fiber, an aramid fiber and a synthetic fiber; or a hybrid fiber yarn which is made by 2-ply yarning a single yarn or a twisted yarn. Here, the following cases are included: all of the weft and warf of said fabric are said hybrid fiber yarn; or when the weft of said fabric is said hybrid fiber yarn, the warf of said fabric is one or more of a single yarn, a twisted yarn or a 2-ply yarn of fiber yarn selected from the group consisting of a glass fiber, a carbon fiber, an aramid fiber and a synthetic fiber; or the weft of said fabric is a single yarn, a twisted yarn or a 2-ply yarn of fiber yarn selected from the group consisting of a glass fiber, a carbon fiber, an aramid fiber and a synthetic fiber, and the warf of said fabric is said hybrid fiber yarn.

Although there are no special limitations to the types of said glass fiber yarn, E-Glass and S-Glass are desirable. Also, there are no special limitations to the fineness of glass fiber yarn, DE 37 1/0 or 1/2, G37 1/0 or 1/2, DE 75 1/0 or 1/2, E 75 1/0 or 1/2, G 75 1/0 or 1/2 is desirable, and among them, G 75 1/2 are most preferred. Here, DE, E, G are abbreviations indicating the diameters of a filament, and the numbers behind are the percentage of pounds per fiber length, and 75 indicates 7500 yds/lb. On the basis of a single yarn and a ply yarn, 1/0 shows a fiber consisting of one kind of a twisted yarn selected from the group of fibers mentioned above, and 1/2 shows a fiber yarn which undergoes 2-ply yarning of one or two kinds of a single yarn selected from the group of fibers mentioned above.

Although there is no special restriction to the fineness of said aramid and synthetic fiber yarns, 300~1500 Deniers is desirable.

The number of twists of said 2-ply yarn is from 3.5 TPI to 4.5 TPI (twist per inch) of cable/ply twist, respectively. At this time, when below 3.5 TPI, the fatigue resistance of a stiffener fabric is likely to decrease, and when above 4.5 TPI, tenacity decrease is too steep so as not to make suitable for the stiffener fabric.

Thereafter, in order to improve the adhesive strength of the selected fiber yarn, chemical and physical treatment processes are carried out on the surface of the fiber yarn.

As said chemical process, at least one kind of method can be selected from the group consisting of a washing process of the fiber yarn in an organic solvent, or a surface-treatment process with a silane compound, or a coating process with organic resin.

The said organic solvent is characterized by strong volatility, being an organic chemical substance in a liquid state which can dissolve any of the materials. The types of organic solvent are largely classified in the following groups: a hydrocarbon, a halogenated hydrocarbon, an alcohol, an aldehyde, an ester, an ether, a ketone, a glycol derivative, and others. The types of a hydrocarbon-based organic solvent, are representatively: a gasoline, a kerosine, an N-hexane, a cyclohexanol, a methylcyclohexanol, a benzene, a toluene, and a xylene. The types of a halogenated hydrocarbon organic solvent are: a dichloromethane, a chloroform, a dichloroethane, a trichloroethane, a tetrachloroethane, a dichloroethylene, a trichlorethylene, a tetrachlorethylene, a chlorobenzene, and an ortho-dichlorobenzene. The types of an alcohol organic solvent are: a 1-butanol, a 2-butanol, an isobutyl alcohol, an isopentyl alcohol, an isopropyl alcohol, and the types of an ethers organic solvent are: an ethyl ether, a dioxane, and a tetrahydro-butane. The types of a ketones organic solvent are: an acetone, a methyl ethyl ketone, a methyl butyl ketone, and a methyl isobutyl ketone. The types of a glycol ether-based organic solvent are: an ethylene glycol monomethyl ether, an ethylene glycol monoethyl ether, and other types of organic solvents are a disulfide, a hydrocarbon, and a cresol.

As examples of silane compounds for silane treatments, the following may be listed: an aminosilane, a vinyl silane, an epoxy silane, a methacrylate silane, an alkyl silane, a phenyl silane, and a chlorosilane. Preferably, a treatment with an aminosilane compound may improve the durability and strength.

Coating with an organic resin is using a high polymer such as an acrylic resin or a urethane resin on the surface to firmly form a uniform film, and in general, a resin emulsion, such as a resin dispension, which is dissolved and dispersed in a solvent or water, is applied to the fiber. Thereafter, a continuous film is formed by vaporizing the solvent or water by heat.

As said physical surface treatment process, at least one kind can be selected from the group consisting of a plasma treatment and a Bulky treatment.

A plasma treatment is a process of washing away organic matters that have been piled up on the surface of the fiber through the plasma cleaning method by using the atmospheric plasma treatment, and this can improve the adhesive strength with other materials by applying endowing roughness on the surface.

After undergoing the chemical and physical surface treatment processes as described above, it passes through the process of manufacturing a stiffener fabric by weaving the fiber yarn.

Hereinafter, the weaving of a stiffener fabric which constitutes the second gas barrier of the present invention will be described.

Upon weaving of a stiffener fabric, when weaving with two or more kinds of a fiber yarn selected from the group consisting of a glass fiber, a carbon fiber, an aramid fiber, and a synthetic fiber, a single yarn or a twisted yarn or a ply yarn, wherein each of the fiber yarns forms the weft and warf, are applied thereupon.

On the other hand, a stiffener fabric according to the present invention may be weaved using the hybrid fiber yarn, wherein two or more kinds of a single yarn or a twisted yarn, which is selected from the group consisting of a glass fiber, a carbon fiber, an aramid fiber and a synthetic fiber, undergoes 2-ply yarning. When weaving by using the hybrid fiber yarn as described above, it is possible to weave the weft and warf with a hybrid fiber yarn of the same kind. For example, a glass-carbon hybrid fiber yarn, which undergoes 2-ply yarning by choosing a single yarn of glass fiber and a single yarn of carbon fiber, may be weaved by applying to the weft and warf.

Also, weaving can be done by applying the hybrid fiber yarn to the weft and applying the fiber yarn which is not a hybrid fiber yarn to the warf, or by applying the hybrid fiber yarn to the warf and applying the fiber yarn which is not a hybrid fiber yarn to the weft.

When weaving a stiffener fabric, in order to achieve optimal strength and physical properties as well as competitive price, it is possible to change the weaving density and mixing ratio of each fiber yarns which constitute the warf and weft. In addition, it is possible to express the diversity of a second gas barrier as an end result. At this time, although there is no special restrictions as to the range of weaving density, the weaving density of a stiffener fabric is preferably in the range of 20~35 count/inch, respectively, and although there is no special restrictions as to the range of weaving form, a flat weave form, a satin weave form, or a twill form can be given as examples.

Also, upon weaving a stiffener fabric, the present invention may undergo weaving by selecting two or more kinds of the fiber yarn at the warf or weft, and the mixing ratio of the selected two kinds of fiber yarn may be weaved at the mixing ratio of 1:1, as well as at various different ratios. For example, as the fiber yarn which is to be applied to the weft, when a 2-ply yarn of a glass fiber and a 2-ply yarn of an aramid fiber is selected, either the glass fiber yarn and the aramid fiber yarn may be alternately weaved at the weft (in this case, the mixing ratio is 1:1), or it may be weaved consecutively at the weft in the order of a glass fiber yarn, a glass fiber yarn, an aramid fiber yarn, a glass fiber yarn, a glass fiber yarn, and an aramid fiber yarn (in this case, the mixing ratio is 2:1).

Also, three kinds of fiber yarn, which are all different from each other, may be selected and each of the above-mentioned three kinds of fiber yarn may be weaved alternately at the warf (1:1:1), and it is also possible to change the mixing ratio to 1:2:1.

In this way, the diversity of the second gas barrier can be expressed through weaving by variously changing the mixing ratio of multiple fiber yarns which form the weft or warf of a stiffener fabric.

Figure 3:
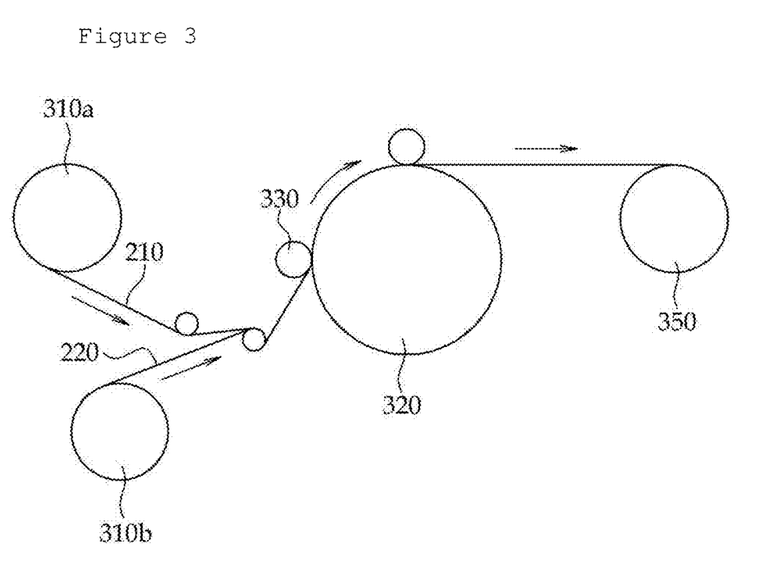
FIG. 3 is schematic manufacturing process chart of a stiffener of the present invention.

A molding process of a stiffener is a process of forming a stiffener (200), which is a process of integrally molding by passing a urethane adhering sheet (210) through a heating roller (320) of 150-180° C. and a pressure roller (330) on one side of the surface of a stiffener fabric (220).

As shown in FIG. 3, a stiffener fabric (220) and a urethane adhering sheet (210) are each allowed to support the feeding roller (310a) (310b) so that a urethane adhering sheet (210) is contacting the surface of one side of said stiffener fabric (220) and is supplied to a heating roller (320), and is passed through a heating roller (320) and a pressure roller (330) to be integrally molded and to undergo a winding process in a winding roller (350).

A stiffener (200), which undergoes a molding process by being passed through a cooling zone before being passed through a pressure roller (330) and undergoing a winding process in a winding roller (350), is stabilized.

A stiffener fabric (220) performs greatly enhanced fatigue resistance by using two or more kinds of fiber yarn, and shows durability and improved adhesion with a urethane adhering sheet (210) by undergoing chemical and physical surface treatment processes.

A urethane adhering sheet (210), wherein the melting temperature is set to be 160° C. or above by the use of a thermoplastic polyurethane elastomer which has a relatively higher heat resistance, is able to ensure the thermal stability of the second gas barrier product, and it is possible to improve the tensile strength as well as hardness by using that which has more than 90 A of hardness in the rubber hardness tester.

Also, said urethane adhering sheet is characterized by being formed in a Blow molding method. The urethane adhering sheet is produced by the method of Blow molding, and Blow molding is a method of making a solid matter in a particular form by premolding (parison) into a tubular shape by extrusion and injection, and then fitting this into a mold and blowing air into the interior for inflation and for cooling solidification. This is a method for producing a film by Blow molding, which is relatively more productive and cost-effective in comparison with the products which are supplied by going through a T-Die and an extruder machine.

A sheeting process is a process of sheeting by laminating a stiffener, wherein a urethane adhering sheet is integrated, on both sides of said aluminum foil, and by going through a continuous molding process with the use of a rotocure molding machine.

The reason why the stiffener molding process and the sheeting process are set individually, is because it is possible to improve the uniformity of a second gas barrier product by preventing distortion of the stiffener and by intermediate checking of a primary molded article through manufacturing of a primary molded article in the stiffener molding process and molding again with the use of a rotocure molding machine.

A stabilizing process is a process for going through a heat treatment and a post cure process for stabilization of the sheeted laminate. The reason for going through a heat treatment and a post cure process is to increase the adhesive strength by stabilizing the molecular arrangement after the melting and adhering of a urethane adhering sheet which is used for adhering a stiffener and an aluminum foil.

A second gas barrier which is produced by the above-described method has a laminate structure in which the stiffener, whereof a part or whole of the configuration fiber is modified, is attached to the both sides of an aluminum foil. (See FIG. 2)

The present invention is characterized by using as a stiffener the woven fabric, which is weaved by applying each of the heterogenous fiber yarns at the warf and weft or by applying a hybrid fiber yarn to at least any one or more places at the warf or weft. Therefore, said stiffener fabric is twisted and weaved by selecting heterogenous kinds of a single yarn or a 2-ply yarn of fiber yarn from a group consisting of a glass fiber, a carbon fiber, an aramid fiber, and a synthetic fiber, or is weaved by applying at the weft and/or warf a hybrid fiber yarn which is made by 2-ply yarning of two kinds of a single yarn of fiber yarn selected from the group consisting of a glass fiber, a carbon fiber, an aramid fiber, and a synthetic fiber. Also, it has a unit weight of 300~400 g/m$^2$.

Hereinafter, a secondary barrier and a manufacturing method thereof according to the present invention will be described in more detail through the preferred examples.

Example 1

Two pieces of the glass fiber yarn (E-Glass, G 75), which is surface-treated with an aminosilane, is plied at 4.0 TPI each through cable/ply twist, and the resulting ply yarn (ECG 75 1/2) is applied at the warf, and two pieces of the aramid fiber yarn (600 Denier), which is surface-treated with an aminosilane, is plied at 4.0 TPI each through cable/ply twist, and the resulting ply yarn (1/2) is applied at the weft.

Through this, a stiffener fabric is weaved by a flat weave method while the weaving density of the warf is at 32 count/inch, and the weaving density of the weft is at 26 count/inch.

After undergoing a stiffener molding process of integrally molding a urethane adhering sheet on one side of the resulting stiffener fabric, the stiffener wherein a urethane adhering sheet is integrated is laminated on both sides of the aluminum foil. Then, by the continuous molding of the laminate with the use of a rotocure molding machine, a secondary barrier laminated sheet is obtained. The resulting secondary barrier laminated sheet undergoes a heat treatment and is allowed to post cure, so that the manufacturing of the secondary barrier laminated sheet is completed.

Example 2

A secondary barrier laminated sheet is manufactured in the same manner as in example 1, excepting that: a ply yarn (ECG 75 1/2) which is produced by plying two pieces of the glass fiber yarn (E-Glass, G 75), which is surface-treated with an aminosilane, at 4.0 TPI each through cable/ply twist, and a ply yarn (1/2) which is produced by plying two pieces of the aramid fiber yarn (600 Denier), which is surface-treated with an aminosilane, at 4.0 TPI each through cable/ply twist, are each weaved by being positioned at the weft at the mixing ratio of 1:1.

Examples 3~5 and Comparative Examples 1~3

A secondary barrier laminated sheet is manufactured in the same manner as in example 1, excepting that the type of fiber yarn constituting a stiffener fabric and the thickness of fiber yarn, the weaving density, and the weaving form are the same as in the following table 1.

TABLE 1

| Indication | Weaving form | Weaving density (count/inch) | | Type of fiber yarn and fiber thickness |
|---|---|---|---|---|
| Example 1 | Flat weave | Warf | 32 | Warf E-Glass(G 75½) |
| Example 1 | Flat weave | Weft | 26 | Weft aramid(600Denier ½) |
| Example 2 | Flat weave | Warf | 32 | Warf E-Glass(G 75½) |
| Example 2 | Flat weave | Weft | 30 | Weft Glass fiber(E-Glass G 75½), aramid fiber(600Denier ½) are alternately applied (1:1) |
| Example 3 | Flat weave | Warf | 30 | Warf Hybrid: Glass + aramid Glass(E-Glass G 75 1/0), aramid(600Denier, 1/0) are twisted ½ |
| Example 3 | Flat weave | Weft | 26 | Weft Hybrid: Glass + aramid Glass(E-Glass G 75 1/0), aramid(600Denier, 1/0) undergoes twisting ½ |
| Example 4 | Flat weave | Warf | 32 | Warf S-Glass (G 75½) |
| Example 4 | Flat weave | Weft | 28 | Weft Hybrid: Glass + aramid Glass(E-Glass G 75 1/0), aramid(600Denier,1/0) are twisted ½ |
| Example 5 | Flat weave | Warf | 32 | Warf E-Glass(G 75½) |
| Example 5 | Flat weave | Weft | 30 | Weft glass fiber(E-Glass G 75½), aramid fiber(600Denier ½) are alternately applied (1:2) |
| Comparative example 1 | Flat weave | Warf | 32 | Warf E-Glass(G 75½) |
| Comparative example 1 | Flat weave | Weft | 30 | Weft E-Glass(G 75½) |
| Comparative example 2 | Flat weave | Warf | 32 | Warf E-Glass(G 75½) |
| comparative example 2 | Flat weave | Weft | 30 | Weft S-Glass(G 75½) |
| Comparative example 3 | Satin weave | Warf | 32 | Warf E-Glass(G 75½) |
| Comparative example 3 | Satin weave | Weft | 30 | Weft E-Glass(G 75½) |

※"1/2" means that 2 strands of fiber yarn was plied into a single strand, "1/0" refers to a single yarn.

The results of measuring each fatigue rupture strengths of a secondary barrier laminated sheet according to the present invention and other laminated sheets are shown in table 2. The fatigue rupture strength indicates the number of times the experiment is repeated, until the sample is ruptured, when force at 2.23 mm of displacement is repeatedly added to it, after the sample undergoes cooling process until stabilization without heat-shrinkage, in the chamber where −139° C. is maintained.

TABLE 2

| Experimental Conditions | Example 1 | Example 2 | Example 3 | Example 4 | Example 5 | Comparative example 1 | Comparative example 2 | Comparative example 3 |
|---|---|---|---|---|---|---|---|---|
| displacement: 2.23 mm Temperature: −139° C. Test Direction: weft | 160,000 | 152,000 | 155,000 | 150,000 | 150,000 | 14,000 | 10,000 | 9,000 |

As shown in Table 2, in the case of a second gas barrier, which is produced by applying a stiffener fabric according to the examples, it is confirmed that the fatigue resistance is improved by 10 times or more, in comparison with a conventional second gas barrier according to the comparative examples.

The present invention described in the above is exemplary only, and in the case of a person having ordinary skills in the art to which the present invention belongs will well understand that various modifications and other examples are possible from this. Therefore, it can be well understood that forms of the present invention are not limited only to those described in the foregoing detailed descriptions. And therefore, the genuine technical scope of protection for the present invention should be defined by the technical ideas of the appended scope of claims. Also, the present invention should be understood as intended to include the spirit of the present invention as defined by the appended claims and all variations and equivalents and alternatives which are within the range of the present invention.

DESCRIPTION OF THE REFERENCE NUMBERS

100: aluminum foil
200: stiffener
210: urethane adhering sheet
220: stiffener fabric
221: aramid fiber
222: glass fiber
310a, 310b: feeding roller
320: heating roller
330: pressure roller
350: winding roller

What is claimed is:

1. A flexible second gas barrier for liquefied gas storage tank with a significant improvement of repeated fatigue resistance under cryogenic conditions, comprising:
a urethane adhering sheet having a first surface opposing a second surface and a thickness between 50 μm and 200 μm; and
a stiffener fabric, including a weft and a warf woven by blend weaving, coupled to the first surface of the urethane adhering sheet, wherein the weft includes a first fiber including one or more of a glass fiber, a carbon fiber, an aramid fiber, and a synthetic fiber and the warf includes a second fiber including one or more of a glass fiber, a carbon fiber, an aramid fiber, and a synthetic fiber, wherein the first fiber is different from the second fiber, wherein the second gas barrier further comprises:
an aluminum foil layer having a first surface opposing a second surface, a purity of greater than 99.2%, and a thickness between about 50 μm and 100 μm, wherein the aluminum foil layer is coupled to the second surface of the urethane adhering sheet;
a second urethane adhering sheet having a first surface opposing a second surface and a thickness between 50 μm and 200 μm, wherein the first surface of the second urethane adhering sheet is coupled the second surface of the aluminum foil layer; and
a second stiffener fabric including a weft and a warf woven by blend weaving coupled to the second surface of the second urethane adhering sheet, wherein the weft includes a first fiber including one or more of a glass fiber, a carbon fiber, an aramid fiber, and a synthetic fiber and the warf includes a second fiber including one or more of a glass fiber, a carbon fiber, an aramid fiber, and a synthetic fiber, wherein the first fiber is different from the second fiber.

2. The flexible second gas barrier according to claim 1, wherein the warf of the stiffener fabric is a glass fiber yarn and the weft of the stiffener fabric is an aramid fiber yarn.

3. The flexible second gas barrier according to claim 1, wherein the warf of the stiffener fabric is a glass fiber yarn and the weft of the stiffener fabric is one of a twisted glass fiber and aramid fiber yarn or an alternately applied glass fiber and aramid fiber yarn.

4. The flexible second gas according to claim 1, wherein weaving densities and mixing ratios of each fiber yarn forming the weft and warf of the stiffener fabric are woven by various mixing.

5. The flexible second gas barrier according to claim 1, wherein a form of each fiber yarn is selected from the group consisting of a single yarn, a twisted yarn, and a 2-ply yarn.

6. The flexible second gas barrier according to claim 1, wherein the stiffener fabric is woven with at least one treatment selected from the group consisting of a chemical surface treatment and a physical surface treatment on the surface of the fiber yarns which forms the stiffener fabric.

7. A flexible second gas barrier for liquefied gas storage tank with a significant improvement of repeated fatigue resistance under cryogenic conditions, comprising:
a urethane adhering sheet having a first surface opposing a second surface and a thickness between 50 μm and 200 μm; and
a stiffener fabric including a weft and a warf coupled to the first surface of the urethane adhering sheet, wherein the weft includes a hybrid fiber yarn woven by 2-ply yarning a twisted yarn, each individual fiber yarn selected from the group consisting of a glass fiber, a carbon fiber, an aramid fiber, and a synthetic fiber; or the warf includes a hybrid fiber yarn woven by 2-ply yarning a twisted yarn, each individual fiber yarn selected from the group consisting of a glass fiber, a carbon fiber, an aramid fiber, and a synthetic fiber, wherein the second gas barrier further comprises:

an aluminum foil layer having a first surface opposing a second surface, a purity of greater than 99.2%, and a thickness between about 50 μm and 100 μm, wherein the aluminum foil layer is coupled to the second surface of the urethane adhering sheet;

a second urethane adhering sheet having a first surface opposing a second surface and a thickness between 50 μm and 200 μm, wherein the first surface of the second urethane adhering sheet is coupled the second surface of the aluminum foil layer; and a second stiffener fabric including a weft and a warf woven by blend weaving coupled to the second surface of the second urethane adhering sheet, wherein the weft includes a first fiber including one or more of a glass fiber, a carbon fiber, an aramid fiber, and a synthetic fiber and the warf includes a second fiber including one or more of a glass fiber, a carbon fiber, an aramid fiber, and a synthetic fiber, wherein the first fiber is different from the second fiber.

8. The flexible second gas barrier according to claim 7, wherein the weft of the stiffener fabric is a plied glass fiber yarn and aramid fiber yarn.

9. The flexible second gas barrier according to claim 7, wherein the weft of the stiffener fabric is hybrid fiber yarn and the warf of the stiffener fabric is one or more of a single yarn, a twisted yarn or a 2-ply yarn of fiber yarn selected from the group consisting of a glass fiber, a carbon fiber, an aramid fiber and a synthetic fiber.

10. The flexible second gas barrier according to claim 7, wherein the weft of the stiffener fabric is a single yarn, a twisted yarn or a 2-ply yarn of fiber yarn selected from the group consisting of a glass fiber, a carbon fiber, an aramid fiber and a synthetic fiber, and the warf of the stiffener fabric is hybrid fiber yarn.

11. The flexible second gas barrier according to claim 7, wherein the stiffener fabric is woven with at least one treatment selected from the group consisting of a chemical surface treatment and a physical surface treatment on the surface of the fiber yarns which forms the stiffener fabric.

12. A gas barrier for liquefied gas storage tank, with significant improvement of repeated fatigue resistance under cryogenic conditions, comprising:

an aluminum foil layer having a purity of greater than 99.2% sandwiched between a first stiffener and a second stiffener each comprising a urethane adhering sheet and a stiffener fabric, wherein the urethane adhering sheet faces the aluminum foil layer and the stiffener fabric includes a weft and a warf woven by blend weaving coupled to a first surface of the urethane adhering sheet, wherein the weft includes a first fiber including one or more of a glass fiber, a carbon fiber, an aramid fiber, and a synthetic fiber and the warf includes a second fiber including one or more of a glass fiber, a carbon fiber, an aramid fiber, and a synthetic fiber, wherein the first fiber is different from the second fiber.

13. The gas barrier according to claim 12, wherein the aluminum foil layer undergoes a first surface treatment with one of a chromate, a plasma, or a corona and a second surface treatment with at least one of a polyamide compound and silane compound.

14. The gas barrier according to claim 12, wherein the urethane adhering sheet has a thickness between 50 μm and 200 μm and comprises a thermoplastic polyurethane elastomer having a melting temperature greater than 160° C. and a rubber hardness greater than 90 A.

15. The gas barrier according to claim 12, wherein the aluminum foil layer has a thickness between about 50 μm and 100 μm.

16. The gas barrier according to claim 12, wherein the stiffener fabric has a weaving density of between about 20 and 30 counts per inch.

17. The gas barrier according to claim 12, wherein the stiffener fabric has a unit weight of about 300 to 400 g/m².

18. The gas barrier according to claim 12, wherein the stiffener fabric is woven with at least one treatment selected from the group consisting of a chemical surface treatment and a physical surface treatment on the surface of the fiber yarns which forms the stiffener fabric.

19. The gas barrier according to claim 12, wherein a form of each fiber yarn is selected from the group consisting of a single yarn, a twisted yarn, and a 2-ply yarn.

* * * * *